United States Patent [19]

Da Silva et al.

[11] Patent Number: 4,867,669
[45] Date of Patent: Sep. 19, 1989

[54] SAFETY AIR PLUG AND EXTRUSION APPARATUS USING SAME

[75] Inventors: Flavio R. Da Silva; Steven E. Spence; Robert F. Shamet, all of McPherson, Kans.

[73] Assignee: American Maplan Corporation, McPherson, Kans.

[21] Appl. No.: 261,909

[22] Filed: Oct. 24, 1988

[51] Int. Cl.[4] .................... B29C 47/88; B29C 47/96
[52] U.S. Cl. ............................. 425/326.1; 251/357; 264/209.4; 425/71; 425/72.1; 425/151; 425/387.1
[58] Field of Search ............... 425/71, 72.1, 151, 153, 425/325, 326.1, 387.1; 251/318, 357, 900; 264/563–568, 209.3, 209.4, 209.5, 211.12; 137/68.1, 70, 219, 467, 516.15, 516.17, 516.19; 261/62

[56] References Cited

U.S. PATENT DOCUMENTS

| 1,177,204 | 3/1916 | Miller | 251/318 X |
| 3,116,348 | 12/1963 | Walker | 261/62 X |
| 3,202,178 | 8/1965 | Wolfe | 251/357 X |
| 3,296,661 | 1/1967 | De Moustier | 425/326.1 |
| 3,784,345 | 1/1974 | Wissinger et al. | 425/325 |
| 3,814,564 | 6/1974 | Streng et al. | 264/560 X |
| 4,088,724 | 5/1978 | Kuhnert | 425/326.1 X |
| 4,708,841 | 11/1987 | Larsen | 425/71 X |

FOREIGN PATENT DOCUMENTS 545484 3/1977 U.S.S.R. ..................... 425/325

Primary Examiner—Richard L. Chiesa
Attorney, Agent, or Firm—Herbert Dubno

[57] ABSTRACT

A safety plug for an extrusion apparatus for extruding pipe is provided with a valve opening when its tether to the extrusion die breaks. The valve can be formed by a disk on a rod which is axially displaceable in a tubular body having a flange forming a valve seat for the disk of the rod. The rod is connected to the chain.

4 Claims, 2 Drawing Sheets

SAFETY AIR PLUG AND EXTRUSION APPARATUS USING SAME

FIELD OF THE INVENTION

Our present invention relates to a safety air-plug assembly and to a pipe or tube extrusion apparatus utilizing same.

BACKGROUND OF THE INVENTION

In the extrusion of pipe or tubing, especially relatively large-diameter pipe or tubing, the tubular extrusion emerging from the extrusion die, to which one or more extruders may be connected to supply the plastified synthetic resin material, e.g. polyvinylchloride, is relatively soft and must be cooled to harden the extrusion into a stable shape. Cooling is commonly effected by contacting the extrusion with a cooling fluid, e.g. water.

Until the extrusion cools sufficiently, it is desirable to maintain a certain air pressure within the extrusion immediately downstream of the die so that the tubular structure or pipe will not collapse or deform.

The air pressure within tubular extrusion may be maintained by forcing air into the extrusion at the die.

The pressure can be maintained by a plug which sealingly engages the inner surface of the extrusion at a location relatively remote from the die and which can be attached flexibly to the die, e.g. via a cable or chain.

One such apparatus utilizing a plug to maintain a pressure upstream of the plug in an extrusion apparatus is described in U.S. Pat. No. 3,296,661.

Plugs for such apparatus have been widely used in practice, although a problem is created when there is a break in the flexible element connecting the plug to the die. Under such circumstances the fluid pressure upstream of the plug may drive the plug uncontrolledly and this is disadvantageous.

OBJECTS OF THE INVENTION

It is the principal object of the present invention to provide an improved air plug for an extrusion apparatus whereby the latter drawback is avoided.

Another object of our invention is to provide an improved air plug which, for safety purposes, will not be propelled by the upstream pressure in the event of a breakage of a flexible element, such as a chain, anchoring it to the extrusion die.

Still another object of this invention is to provide an improved extrusion apparatus for the production of synthetic resin pipe with a highly desirable safety feature.

SUMMARY OF THE INVENTION

These objects and others which will become apparent hereinafter are attained, in accordance with the present invention by providing a safety plug which is tethered to the extrusion die of a pipe or tube extrusion apparatus and which is received in the tubular extrusion at a location remote from the extrusion die so as to maintain, under normal conditions, an air pressure upstream of that plug. According to the invention, the plug is provided with valve means opening automatically upon release of the tether which connects it to the extrusion die, thereby venting the upstream space to a location downstream of the plug and preventing the plug from being propelled by fluid pressure at the upstream side thereof.

According to a feature of the invention, the valve means includes a rod guided centrally through a tubular body of the plug and having at an end turned toward the extrusion die, a means connecting the rod to the tether which can be a chain. At this end, the rod may be provided with a screw thread and a shackle threaded onto the rod for connection to the chain, thereby allowing some degree of adjustability of the shackle with respect to the rod.

The valve means at the opposite end of the rod, i.e. the end turned away from the die or turned in the downstream direction, can be formed with an annular valve disk which can confront an annular flange provided on the corresponding end of the tubular body so that a seal is established around the tubular body until the rod is released by breakage of the chain or the like. In this case the plug when frictionally held in contact with the wall of the tubular extrusion, the rod will be displaced relative to the tubular body to separate the disk from the flange and relieve the pressure at the upstream side of the plug, thereby preventing it from being driven by this pressure in the downstream direction.

At the last-mentioned end, the rod can be provided with another screw thread onto which a nut can be threaded to form a stop for the annular disk. Either the flange or the disk or both can be provided with 0-rings or other equivalent sealing means.

According to another feature of the invention, a sealing arrangement is provided around the tubular body to engage the inner wall of the tubular extrusion. In that case, two seals can be provided in axially-spaced relationship and can be held apart by tie rods located outwardly of the tubular body and which may be provided with means for clamping rigid plates against the resilient disk-shaped sealing member. The seal assembly can be held between the flange and a nut threaded onto the end of the tubular body turned in the upstream direction.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
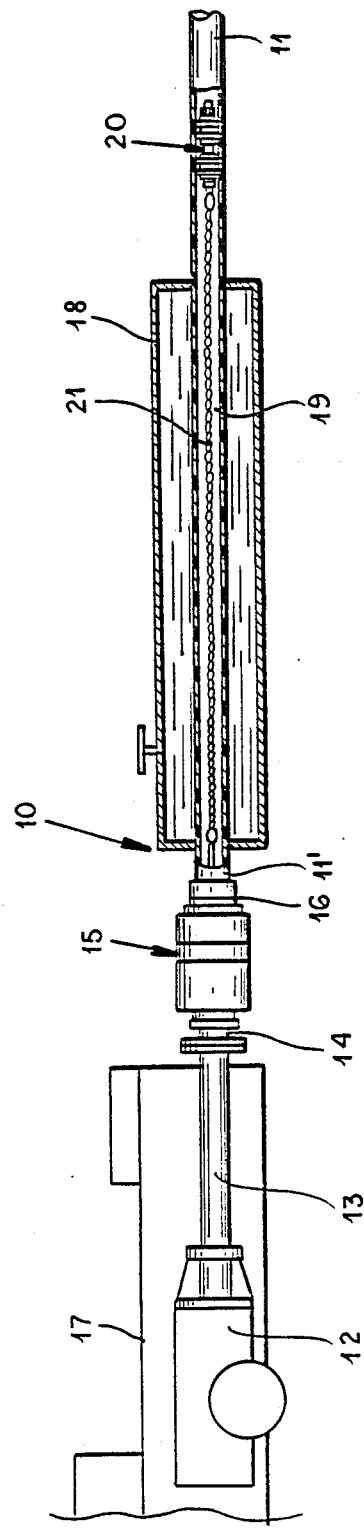
FIG. 1 is a side elevational view, partly broken away and in highly diagrammatic form, illustrating a pipe extrusion apparatus including a safety air plug in accordance with the invention.

In FIG. 1 of the drawing, we have shown an extrusion apparatus 10 for the extrusion of large-diameter pipe 11, e.g. of polyvinylchloride, which comprises a worm-type extruder 12 to which the PVC is fed in powder form and which plastifies the PVC and forces it via the pipe 13 to an adapter 14 having a pipe head 15 with an extrusion die 16 connected thereto. The structure represented at 17 symbolizes the heating apparatus generally associated with the extrusion press so that the powder is not only masticated and subjected to shear by the worm, but is also raised to a plastifying temperature.

The extrusion 11' emerging from the die is relatively soft and must be cooled to harden it into the pipe 11. Immediately downstream of the extruder, therefore, a cooling means in the form of a water jacket 18, can be provided.

To maintain the air pressure in an upstream space 19, a plug 20 is received in the pipe 11 and is held in place by a tether in the form of a chain 21 which can be anchored to the die. Compressed air can be admitted to the upstream space by means not shown in the drawing, but as described, for example, in the aforementioned U.S. patent. Because the chamber 19 is under pressure upstream of the plug, should the tether 21 break, the plug 20 and any remnant of the tether attached thereto would be propelled to the right. This drawback is avoided by the invention.

Figure 2:
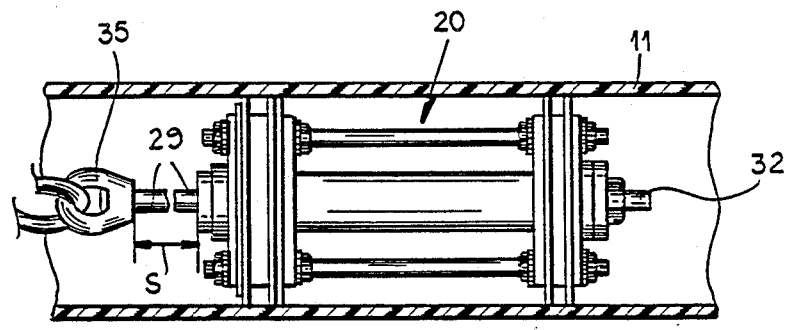
FIG. 2 shows a cross section through the pipe with the plug in elevation and drawn to a larger scale than FIG. 1.

The plug 20 (see FIGS. 2 and 3), comprises a tubular body 22 which is threaded externally at 23 to receive a nut 24 at one end.

At its other end, a flange 25 is welded flush with the downstream end of the tubular body 22.

The flange 25 is juxtaposed with an annular disk 26 having grooves receiving 0-rings 27 and which can sealingly abut the flange when a boss 28 of the disk fits into the tubular body 22 as a rod 29 is held by the tether 21 and fluid pressure in the upstream space 19 urges the tubular body 22 to the right. This closes the valve and allows the pressure buildup in the space 19.

The rod 29 is guided on a pair of disks 30 slidable within the tubular body 22 with a minimum of frictional contact. These disks have holes 31 which permit the escape of air and permits air under pressure within the compartment 19 to reach the boss 28.

The rod 29 has screwthread 32 onto which a nut 33 is screwed to brace the annular disk 26. At its opposite end, the rod 29 is provided with a screwthread 34 onto which a shackle 35 is screwed to receive the end of the chain 21. The spacing S between the shackle 35 and the upstream end of the tubular body is greater than spacing D between the downstream disk 30 and a split ring 36 lodged in a groove along the inner wall of the tubular body and constituting a stop for the rod in its movement to the right.

The sealing means for sealing the plug with respect to the inner wall of the pipe 11 comprises two sealing units respectively interconnected by tie rods 37.

The upstream unit comprises three rigid plates 38, 39 and 40 which, in pairs, sandwich a rigid support ring 41 and 42 against respective rubber rings 43 and 44, respectively. The disks 38-40 are clamped together against these rings between a pair of nuts 45, 46 on a threaded end 47 of each rod 37. The rubber rings slide against the inner wall of the bore.

This sealing unit is braced against the nut 24 previously mentioned.

At the opposite ends of the rods 37, threaded portions 48 are provided onto which nuts 49 are threaded to clamp individual rubber rings 50 and 51 between a central plate 52 and a pair of support disks 53, 54 outwardly flanking the rubber rings. In operation, as long as the chain 21 remains intact, the plug will be tethered at an appropriate point in the extruded pipe 11 and an air pressure is maintained upstream of the plug.

Figure 3:
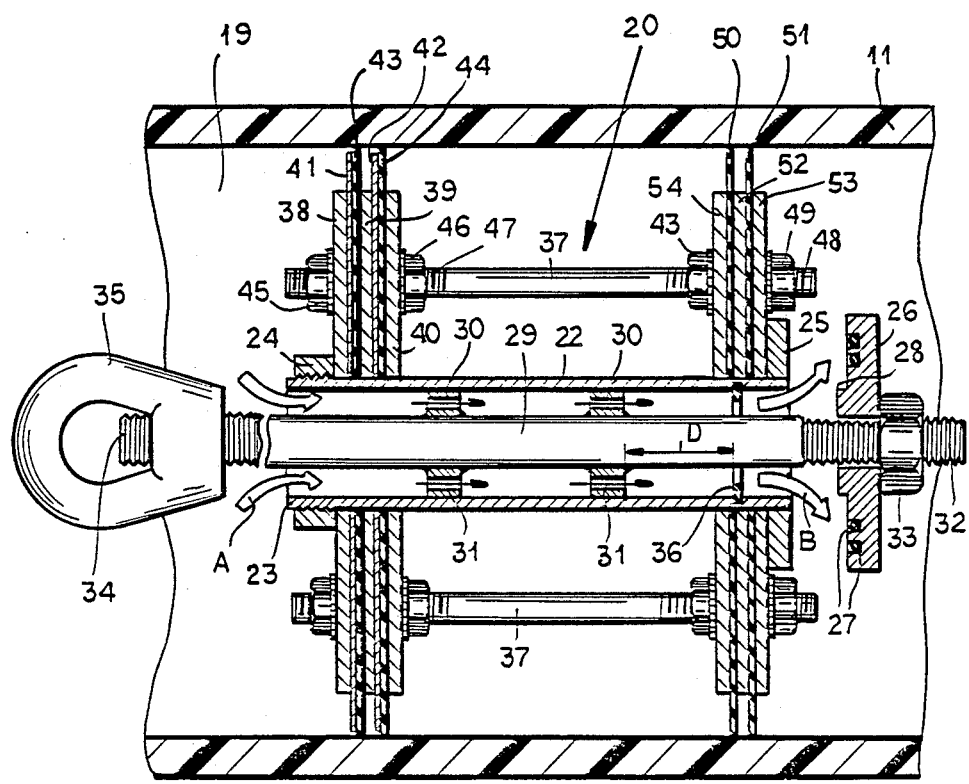
FIG. 3 is an axial section through the tubular extrusion and the pipe drawn to still a larger scale.

However, should the chain break, while the balance of the plug is frictionally retained, the fluid pressure applied to the boss 28 will shift the rod 29 to the right to open the valve and permit the escape of air as represented by the arrows A and B in FIG. 3. The valve is shown closed in FIG. 2 and open in FIG. 3.

We claim:

1. A safety plug for retaining a fluid pressure upstream of said plug in a tubular extrusion as long as a flexible element maintains traction on said plug, said plug comprising valve means opening upon release of said plug by said element to prevent displacement of said plug by pressure in said extrusion, said valve means being held closed while said plug is connected with an extrusion die by said flexible element, said plug comprising:
    a tubular body;
    a rod guided in and axially shiftable relative to said tubular body;
    means for connecting one end of said rod to said flexible element;
    sealing means on said tubular body slidingly engageable with an inner wall of said tubular extrusion, whereby said fluid pressure urges said tubular body in a downstream direction;
    a first valve member on said rod and a mating second valve member on said tubular body, said valve members forming said valve means, said first valve member being retained in position by said flexible element while said valve means is closed, but shifting with said rod upon rupture of said flexible element to open said valve means, said second valve member is an annular flange forming a valve seat and formed on said tubular member at an end thereof turned in a downstream direction, and said first valve member is an annular disk mounted on an end of said rod opposite that connected with said flexible element and juxtaposed with and engaging said seat;
    O-rings on one of said flange and said disk for sealing between said flange and said disk in a closed position of said valve means;
    a screwthread formed on said rod at an end thereof turned in a downstream direction and carrying said disk, and a nut threaded onto said screwthread and bracing said disk, said rod being formed with another screwthread at an end thereof turned in an upstream direction, said means for connecting one end of said rod to said flexible element being a shackle threadedly engaging said another screwthread and spaced from the tubular body; and
    at least two guide rings on said rod slidably engaging an inner wall of said tubular body and provided with bores permitting passage of fluid therethrough, said sealing means including two axially spaced pairs of rigid disks each clamping a respective resilient sealing disk between them and mounted on said tubular body, said resilient disks extending outwardly beyond the respective rigid disks, a ring is threaded onto said tubular body at an end thereof turned toward said extrusion die, said pairs of rigid disks being braced respectively against said ring and said flange, said sealing means further comprising tie rods outwardly of said tubular body and rigidly connecting said pairs of rigid disks together.

2. In an extrusion apparatus wherein a continuous tubular extrusion is extruded from an extrusion die and cooled, and wherein a fluid pressure is maintained within said tubular extrusion to prevent collapse thereof during cooling by anchoring a plug in said extrusion at a distance from said extrusion die by a flexible element connected to said extrusion die, the improvement wherein: said plug is formed with valve means opening upon release of said plug by said element to prevent displacement of said plug by pressure in said extrusion, said valve means being held closed while said plug is connected with said extrusion die by said flexible element, said plug comprising:

a tubular body;

a rod guided in and axially shiftable relative to said tubular body;

means for connecting one end of said rod to said flexible element;

sealing means on said tubular body slidingly engageable with an inner wall of said tubular extrusion whereby said fluid pressure urges said tubular body away from said extrusion die;

a first valve member on said rod and a mating second valve member on said tubular body, said valve members forming said valve means, said first valve member being retained in position by said flexible element while said valve means is closed, but shifting with said rod upon rupture of said flexible element to open said valve means, said second valve member being an annular flange forming a valve seat and formed on said tubular member at an end thereof remote from said extrusion die and said first valve member being an annular disk mounted on an end of said rod opposite that connected with said flexible element and juxtaposed with and engaging said seat;

O-rings on one of said flange and said disk for sealing between said flange and said disk in a closed position of said valve means;

a screwthread formed on said rod at an end thereof turned away from said extrusion die and carrying said disk, and a nut threaded onto said screwthread and bracing said disk, said rod being formed with another screwthread at an end thereof turned toward said extrusion die, said means for connecting one end of said rod to said flexible element being a shackle threadedly engaging said another screwthread and spaced from the tubular body; and at least two guide rings on said rod slidably engaging an inner wall of said tubular body and provided with bores permitting passage of fluid therethrough, said sealing means includes two axially spaced pairs of rigid disks each clamping a respective resilient sealing disk between them and mounted on said tubular body, said resilient disks extending outwardly beyond the respective rigid disks.

3. The improvement defined in claim 2 wherein a ring is threaded onto said tubular body at an end thereof turned toward said extrusion die, said pairs of rigid disks being braced respectively against said ring and said flange, said sealing means further comprising tie rods outwardly of said tubular body and rigidly connecting said pairs of rigid disks together.

4. The improvement defined in claim 2 wherein said flexible element is a chain.

* * * * *